April 8, 1941.　　　　O. W. PINEO　　　　2,237,950
DIRECT CURRENT AMPLIFIER
Filed March 19, 1940　　　2 Sheets-Sheet 1

INVENTOR.
ORRIN WESTON PINEO,
BY Robert Ames Norton
ATTORNEY.

Patented Apr. 8, 1941

2,237,950

UNITED STATES PATENT OFFICE 2,237,950

DIRECT CURRENT AMPLIFIER

Orrin Weston Pineo, Milo, Maine, assignor to American Cyanamid Company, New York, N. Y., a corporation of Maine Application March 19, 1940, Serial No. 324,766

3 Claims. (Cl. 250—41.5)

This invention relates to direct current amplifiers of the vacuum tube voltmeter or current-meter type, and particularly to direct current amplifiers for the amplification of current or voltage differences from a plurality of photocells as used in colorimetry or spectrophotometry.

The amplification of very small direct current differences presents a serious problem which arises particularly with differential spectrophotometers and colorimeters requiring the measurement of minute difference currents or voltages from a pair of photocells. Such sensitive measurements require a device which is relatively insensitive to changes in electrical conditions in the measuring instrument itself and particularly one which is not seriously affected by a change in the average of the individual potentials or currents whose difference is to be measured. High sensitivity requires amplification of small potential or current differences and in general such amplification can only be practically effected by using some type of thermionic amplifier. The ordinary vacuum tube direct current voltmeter, in which a current meter indicates amplified current changes in the plate circuit resulting from much smaller changes in the grid circuit is not suitable for precise measurements of difference currents or potentials. This is particularly true in the case of differential colorimeters and spectrophotometers where high accuracy and reproducibility is necessary, and where the current or potential differences to be measured are small compared to changes in the average of the individual potentials and currents resulting from wide variation in average brightness of samples. Instrumental errors due to variation in the electrical conditions of the instrument itself renders the ordinary vacuum tube direct current voltmeter inaccurate for measuring very small difference potentials or currents even if there are no great variations in the average of the currents or potentials.

It has been proposed in the past to overcome or minimize instrumental errors due to changing plate voltage, grid bias, and the like, by using two matched vacuum tubes in a Wheatstone bridge circuit for measuring difference voltages and currents. When balanced, such a circuit completely cancels out errors due to such changes. However, when the bridge is unbalanced, these changes cause fluctuation of the indicating meter. This bridge circuit has been practically applied to a colorimeter for the measurement of the difference of potentials from two photocells and is described in U. S. Patent 1,834,905. The patent describes fixed grid bias using batteries. In practice the usual type of rectified power supply is employed, the grid bias being obtained from a voltage divider and therefore being of the semi-fixed variety but due to the relatively small range of normal grid variations in the instrument, the bias can be considered as fixed. While such an instrument has been practically used, it is open to a very serious disadvantage because the current through the bridge and hence the meter indication across the bridge for all conditions except balance, changes with the average of the potentials from the photocells applied to the two grids. Thus, the same difference at different levels would give a different reading on the meter. In practical operation of the device, readings are obtained on the meter for light from a sample and standard applied to the two photocells and then sample and standard are reversed resulting in a different reading of the meter and the difference between the two readings is taken. It will thus be apparent that the device is operated with the bridge in an unbalanced condition and the readings obtained will vary with the operating potentials of the bridge.

In colorimeters, the question of level of potential at the two grids is of utmost importance because samples have to be compared which vary greatly in average brightness and the magnitude of the two photocell currents when comparing a bright sample with a bright standard may be enormously higher than when comparing a dark sample with a dark standard. Further variations in level result from fluctuations in the intensity of the colorimeter light source.

The accuracy of the bridge direct current amplifier depends on matched thermionic tubes, otherwise the advantage of a bridge will not obtain, because unless the vacuum tube arms vary equally with changes in operating voltages, such changes will cause spurious indications. In practice it is not possible to match two vacuum tubes except at one operating point on their characteristic curves. They will then stay fairly well matched over a narrow range of variation from this point, but will not stay matched when the variations become large. Hence large variations in the average grid bias due to changes of magnitude of the photocell current will cause unsteadiness in readings. This difficulty was appreciated and in practical instruments according to the U. S. Patent 1,834,905, manual means were provided for adjusting the fixed grid bias to bring the bridge current to the point at which the tubes are matched and these adjustments have to be made every time the relative level of brightness of the sample is materially changed. Not only is it awkward and cumbersome to effect a manual adjustment each time a different set of samples are to be compared, but the adjustment is frequently only approximate, and the device therefore operates normally at all times in a slightly unmatched condition. With care the colorimeter can be successfully operated, but the necessity for manual adjustment and the limitation on the stability constitute very serious practical drawbacks.

The nature of the difficulties encountered due to bridge asymmetry can be brought out more clearly by considering the generalized mathematical basis of the bridge amplifier. In this discussion the following symbols will be used: $\mu$ (mu) is the amplification constant of the tubes; $g_m$ the tube transconductance or mutual conductance; $E_p$ plate voltage; $E_g$ total grid voltage; $E_c$ grid bias; $i$ current; $R$ input load resistance; $I_g$ current through the bridge galvanometer circuit; $\epsilon$ (epsilon) an apparent voltage in the grid-cathode circuit dependent on heater temperature and cathode emitting properties. The prefix $d$ denotes a difference at different times in the term to which it is applied; $\delta$ (delta) denotes a difference between the two bridge arms due to asymmetry. The generalized symbol for a function $f(\ )$ is used in its ordinary sense.

The equation which defines the tube characteristic is $I_p = f(E_p/\mu + E_g + \epsilon)$. This defines plate current as a function of plate and grid voltages and cathode emission. When the bridge is used to measure a direct current difference potential such as for example, the difference obtained from two photocells used in a colorimeter, the input voltages to the two grids are $iR$ and $iR + \delta iR$. It is desired to measure $d\delta R$ resulting from interchanging the sample and standard. The smallest value which can be measured is set by the size of the spurious fluctuation readings.

The generalized expression for the bridge output is as follows:

$$dI_g = \frac{g_m}{2}\left[d\delta iR + d\delta\epsilon + diR\left(\frac{\delta R}{iR} + \frac{\delta f}{f}\right) + dE_c\cdot\frac{\delta f}{f} + \frac{dE_p}{\mu}\left(\frac{\delta f}{f} - \frac{\delta\mu}{\mu}\right)\right]$$

In practical operation with the ordinary tubes which would be used, $iR$, $-E_c$ and $$\frac{E_p}{\mu}$$

are of the same order of magnitude. Consequently as the supply voltages are both taken from the same voltage divider, supply voltage fluctuations act on the asymmetry $\delta f/f$ to cause somewhat compensating fluctuations. The largest fluctuations arise in the term which contains $diR$ because very large variations of $diR$ are normally encountered for fairly small fluctuations in power supply due to the fact that the light output from colorimeter lamps varies as the fifth power of the voltage. The fluctuations involving $diR$ are therefore of considerable importance because if we assume an asymmetry in $iR$ and $f$ of 5%, then $$\frac{d\delta iR}{iR}$$

can only be measured down to ¼%. If separate lamps are used in the colorimeter they must be kept alike within ¼% of the light output, or ¹⁄₂₀% of the voltage in order to produce no greater errors.

The present invention overcomes these drawbacks in two ways. Both of these methods constitute features of the invention and each one gives improved results. Complete stability toward all instrumental errors including changes in plate voltage applied to the bridge can only be obtained by a combination of the two features.

The first feature of the present invention avoids difficulties due to change in level of grid voltage by applying only the difference voltage between the grids of the tube bridge, and connecting one grid directly to the normal grid bias. The grid bias in such an arrangement does not change with change in the individual voltages or currents whose difference is to be measured, because only the difference current flows through a resistor connecting the grids and one grid is maintained continuously at a predetermined bias whereas the other grid varies in its bias only by the amount of difference voltage.

With differential input the term in $diR$ vanishes, and the errors are mostly due to fluctuations in $E_p$ acting on the asymmetry in $\mu$. The latter can be kept within 5% and hence if $E_p$ is regulated to 1%

$$\frac{d\delta i}{i}$$

can now be measured down to ¹⁄₂₀%. The apparatus thus becomes five times as sensitive without any change in the characteristics of the tubes or the indicating instrument used.

Differential input does not affect the last two terms of the equation and these terms then constitute the main sources of fluctuation. These can be greatly reduced by the second feature of the present invention which constitutes the substitution for the fixed or semi-fixed grid bias of the bridge tubes, an exaggerated form of self bias. When a self bias cathode resistor is employed in the circuit to effect grid bias, the grid bias will change with current passing through the tubes and will increase with increase in current. Self bias, therefore, tends to reduce the changes in current with changes of voltage on the grid, the tendency being toward a constant current through the bridge. According to the present invention this effect is enhanced by the use of what is termed "exaggerated self bias." Instead of using a biasing resistor of value such that in the ordinary or normal operation without external signal the drop in voltage in the resistor is equal to the desired grid bias, a much larger resistance is employed, so large in fact that it produces a voltage drop which is far in excess of normal grid bias and which is very large in comparison with the variations in grid voltage due to different magnitudes to photocell current or other potentials.

Exaggerated self bias alone, without differential input, decreases the fluctuations due to some terms of the equation by a factor of $1/\mu$:

$$dI_g = \frac{g_m}{2}\left[d\delta iR + d\delta\epsilon + diR\left(\frac{\delta R}{iR} + \frac{1}{\mu}\cdot\frac{\delta\mu}{\mu}\right) - \frac{dE_c}{\mu}\cdot\frac{\delta f}{f} - \frac{dE_p}{\mu}\cdot\frac{\delta\mu}{\mu}\right]$$

If the supply voltages are both taken from the same voltage divider, fluctuations therefrom can be completely eliminated as follows: Since $dE_c/E_c$ is equal to $dE_p/E_p$, make $$E_p/-E_c = \frac{\delta f}{f}\Big/\frac{\delta\mu}{\mu}$$

by adjusting the value of the self biasing resistor and the potential between the negative end of the self bias resistor and the grid. However, the term in $d\ iR$ does not vanish but it is somewhat reduced. In order to obtain still greater sensitivity and accuracy a combination of differential input and exaggerated self bias can be used, the differential input thus causes this term to vanish, whereupon $$dI_o = \frac{g_m}{2}(Rd\delta i + d\delta\epsilon)$$

Nothing can be done to reduce the term $d\delta\epsilon$ because this is dependent on the fluctuations in $\epsilon$ in the two different tubes forming the arms of the bridge. Thus the ultimate limitation to the smallness of signal that can be measured is set by the differential fluctuation of the constant $\epsilon$ which is dependent on the cathode emission of the tubes. Regulating the cathode heater current, and operating the two heaters in series, does not remove the fluctuation of one with respect to the other which apparently is caused by more or less random drifts in the surface properties of the cathodes. Expressed in terms of equivalent retarding potential on the grid, these emission fluctuations amount to 100 microvolts or so, which consequently is the magnitude of the smallest $R.d\delta i$ which can be measured.

The invention will be described in conjunction with the drawings which show three typical circuits and in which.

Figure 1:
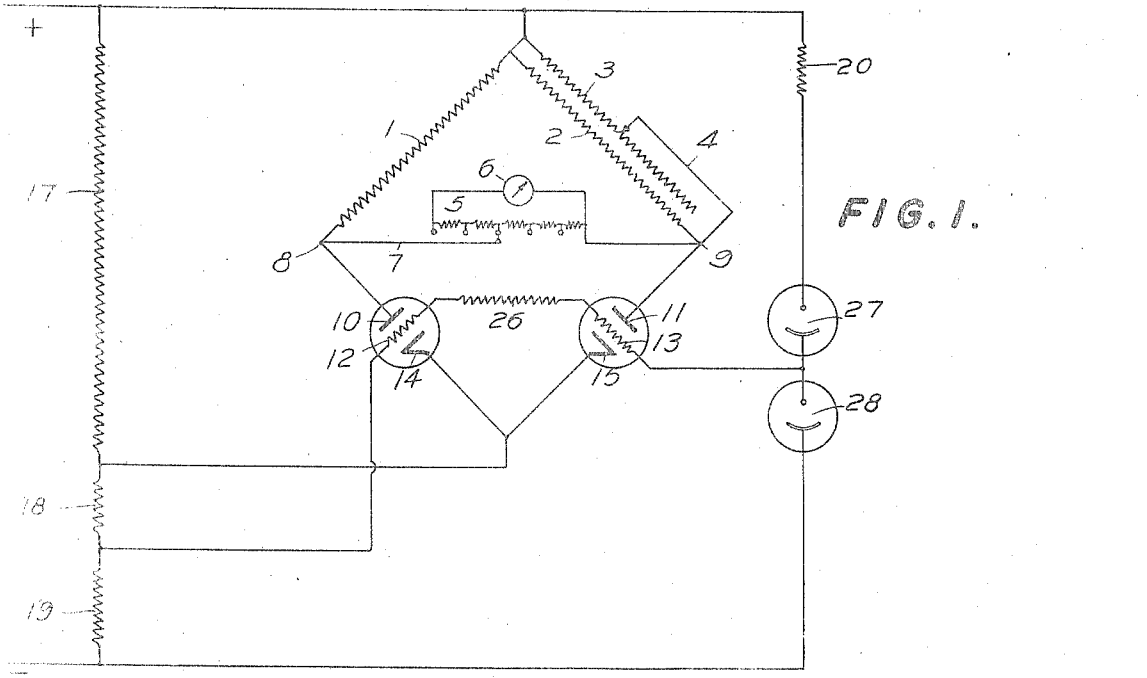
Fig. 1 is a diagrammatic circuit of an amplifier with differential input from two photocells.

The amplifier of Fig. 1 is provided with a suitable source of D. C. voltage marked + and — which is divided by a three resistor voltage divider marked 17, 18, and 19. Positive voltage is fed to the center of the two resistance arms 1 and 2 of a Wheatstone bridge. Resistance arm 1 is shown as fixed and resistance 2 can be varied slightly by means of a large variable shunt resistance 3 with movable contact 4. The midpoints 8 and 9 of the bridge are connected respectively to one end of a suitable shunt, for example an "Ayreton" galvanometer shunt 5, and to a movable contact or switch 7. This permits adjusting the sensitivity range of the galvanometer 6 across which the shunt is connected. The other two arms of the bridge are thermionic vacuum tubes containing plates 10 and 11, grids 12 and 13, and cathodes 14 and 15, the two cathodes being connected together. The vacuum tubes are shown diagrammatically as triodes but may be any tubes of suitable characteristics. If compactness is desired it is possible to use a twin triode in which all six tube elements are arranged in the same envelope, for example a type 79 tube. Throughout the specification and claims the functional elements of the tubes are considered. A twin amplifier tube is therefore considered as two tubes, the fact that both sets of tube elements are enclosed in a single shell is merely a matter of mechanical design. Electrically, the twin tube is indistinguishable from two separate tubes except that the cathodes are internally connected.

The two joined cathodes are connected to a point of the voltage divider between resistances 17 and 18 and the grid 12 to a lower point between resistances 18 and 19. The two grids are connected together through a high resistance 26. Two photocells 27 and 28 are shown in series, together with a protective resistor 29 across the source voltage.

Two beams of light strike the photocells, for example, the two beams of light in a colorimeter or any other similar device where it is desired to measure the difference between two light beams. If the electron stream from cathode to anode in photocell 27 is different from that in 28, there will be a difference current flowing through resistance 26. This difference current is not affected by the level of the intensity of the two beams on photocells 27 and 28 but only by the difference in the two beams. Hence the bridge will register accurately even with very large fluctuations in the average intensity of the light on the two photocells.

Figure 2:
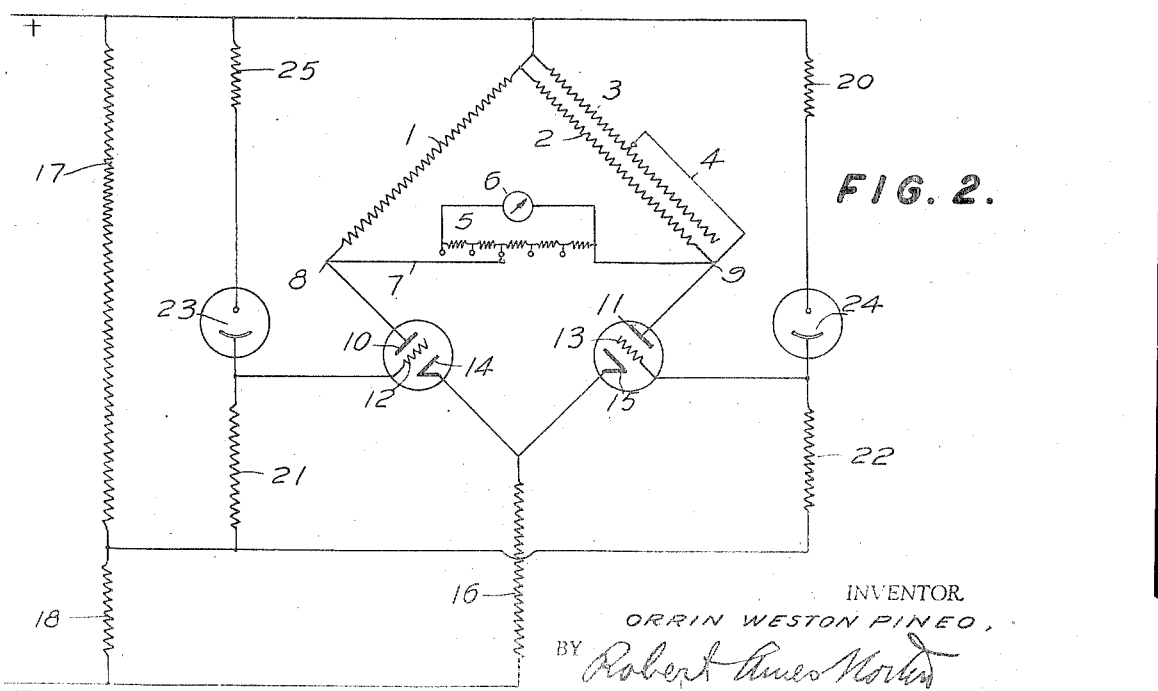
Fig. 2 is a diagrammatic circuit of an amplifier for two photocells using exaggerated self bias.

Fig. 2 shows a bridge in which the same elements are given the same reference numerals. In this case, however, the voltage divider consists only of two resistors 17 and 18 and instead of a differential input from two photocells in series, separate inputs from photocells 23 and 24 are provided to the grids 12 and 13. Each photocell is in series with a protective resistor 25, 26 and a load resistor 21, 22. The vacuum tube cathodes are connected to a high resistance cathode resistor 16 which leads to the negative end of the voltage divider and which provides a voltage drop very large in comparison with the normal grid bias for the tubes. The value of the resistance is not critical but can advantageously be of the general order of magnitude of the internal plate resistance of the tubes. Even larger values can be used but entail very high voltage supplies. The size of the resistors 16 and 18 are so chosen that the voltage drop in resistor 16 is greater than in resistor 18 by the amount of the normal grid bias —Ec. This grid bias is chosen at the point at which the individual tube characteristics are most nearly matched.

Since the exaggerated self bias is very large in comparison both to the normal grid bias and to signal variations to be measured, changes in average grid bias by changes affecting both sources of input voltage in resistors 21 and 22 have relatively small effects. The degree to which this stability is obtained is a matter of economics and it can be made to reach any value by sufficiently high values of the resistors 16 and 18 with corresponding high voltages across the voltage divider. The stability is therefore really determined only by the power supply voltage which is practical or convenient for the instrument.

It will be noted that it is necessary only to calibrate the instrument, that is to say, balance the tubes and resistors, at one characteristic point. The instrument will then operate, with a high degree of accuracy and without further adjustment, over a wide range of input voltage in resistors 21 and 22. It is not necessary to readjust by hand with changes in level of the average potential of the sources 19 and 20.

Another important effect of the exaggerated self bias is that signal swings on one grid are carried by both grids. The large self bias resistor keeps total current through the two tubes substantially constant. When a signal is impressed on one grid only, the other grid voltage moves up or down to compensate for the change in current of the tube receiving the signal. For example if one grid receives a two volt positive signal the additional voltage drop in the self bias resistor is one-half as great, or one volt. The net effect is that the grid receiving this signal goes one volt positive and the other grid one volt negative. Thus a signal is divided between the two tubes and the accurate range of the amplifier is doubled. This permits doubling the resistors 21 and 22 and therefore the sensitivity, without loss in accuracy.

Figure 3:
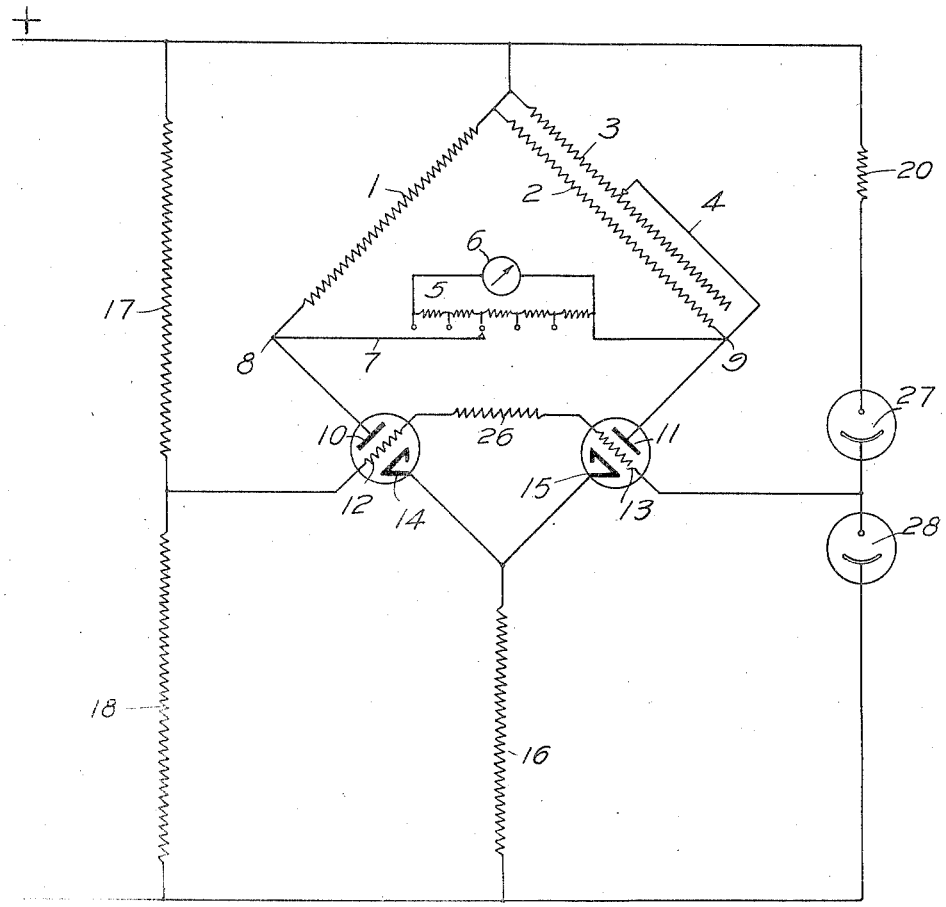
Fig. 3 is a diagrammatic circuit of an amplifier employing both differential input and exaggerated self bias.

Fig. 3 shows an amplifier which combines the differential input of Fig. 1 with the exaggerated self bias of Fig. 2. The photocell and load resistances bear the same reference numerals as in Fig. 1 and the bias resistor the same reference numerals as in Fig. 2. In this modification fluctuations in average light intensity on the photocells are completely balanced out by the differential input and all of the fluctuations except those due to the cathode emission are greatly reduced by the exaggerated self bias. The resistor 16 is chosen with reference to the particular tubes so as to balance out any fluctuations due to supply voltage changes as has been described above in connection with the discussion of the general mathematics of the amplifier. Fig. 3 therefore permits the maximum accuracy and sensitivity possible with an instrument employing the features of the present invention.

The circuits of the drawings have been shown in the form in which practical commercial amplifiers are built, that is to say, those using a D. C. potential from a suitable source and obtaining the various operating voltages from a voltage divider. This is the preferred form but obviously some of the voltages may be obtained from other sources. Thus, for example, the photocell voltages need not be obtained from the same source of potential as the bridge itself, and on the contrary may receive their potential from any suitable external source.

What I claim is:

1. A vacuum tube amplifying device for measuring differential photocell currents comprising in combination a plurality of photocells and load resistances, a four arm bridge of which two arms are resistances and two arms thermionic vacuum tubes, a source of direct current potential applied across the bridge, current measuring means across the midpoints of the bridge, input circuits applying difference voltages to the grids of the tubes, a connection from the negative end of the direct current supply potential comprising resistance in which the normal operating current of the tubes produces a potential drop large in comparison with the operating grid bias of the tubes and in comparison with variations of the input difference to be measured, means for applying a positive potential between the low potential end of said resistance and at least one grid of the tubes, said positive potential being equal to the normal voltage drop in the resistance less normal operating grid bias, and means for applying potentials from said photocells to the input circuits of the grids.

2. A vacuum tube amplifying device for measuring differential photocell currents comprising in combination a plurality of photocells and a load resistor, a four arm bridge of which two of the arms are resistances and two arms thermionic vacuum tubes, a source of direct current potential applied across the bridge, current measuring means across the midpoints of the bridge, means for applying an operating grid bias to both grids from the same point, and means for applying a difference voltage from the photocells between the two grids.

3. A vacuum tube amplifying device for measuring differential photocell currents comprising in combination a plurality of photocells and a load resistor, a four arm bridge of which two of the arms are resistances and two arms thermionic vacuum tubes, a source of direct current potential applied across the bridge, current measuring means across the midpoints of the bridge, means for applying an operating grid bias to only one of said grids, means for applying a difference voltage from the photocells between the two grids, a connection from the negative end of the direct current supply potential comprising resistance in which the normal operating current of the tubes produces a potential drop large in comparison with the operating grid bias of the tubes and in comparison with variations of the input difference to be measured, and means for applying a positive potential between the low potential end of said resistance and the biased grid, said positive potential being equal to the normal voltage drop in the resistance less normal operating grid bias.

ORRIN WESTON PINEO.